(12) United States Patent
Soreide et al.

(10) Patent No.: US 7,430,070 B2
(45) Date of Patent: Sep. 30, 2008

(54) METHOD AND SYSTEM FOR CORRECTING ANGULAR DRIFT OF LASER RADAR SYSTEMS

(75) Inventors: David C. Soreide, Seattle, WA (US); Jonathan M. Saint Clair, Seattle, WA (US); Ordie D. Butterfield, Sumner, WA (US); Mitchell D. Voth, Lake Tapps, WA (US)

(73) Assignee: The Boeing Company, Chicago, IL (US)

( * ) Notice: Subject to any disclaimer, the term of this patent is extended or adjusted under 35 U.S.C. 154(b) by 253 days.

(21) Appl. No.: 11/391,911

(22) Filed: Mar. 29, 2006

(65) Prior Publication Data

US 2007/0229929 A1 Oct. 4, 2007

(51) Int. Cl.
*G02B 26/08* (2006.01)
*G01S 7/40* (2006.01)

(52) U.S. Cl. .............. 359/202; 359/201; 359/204; 359/900; 342/174

(58) Field of Classification Search ......... 359/201–204; 342/174
See application file for complete search history.

(56) References Cited

U.S. PATENT DOCUMENTS

| 4,293,202 | A | * | 10/1981 | Ohnishi et al. | 396/549 |
| 5,903,378 | A | * | 5/1999 | Takano et al. | 359/201 |
| 6,020,937 | A | * | 2/2000 | Bardmesser | 348/756 |
| 7,215,413 | B2 | | 5/2007 | Soreide et al. | |
| 2006/0132803 | A1 | | 6/2006 | Clair et al. | |

OTHER PUBLICATIONS

U.S. Appl. No. 11/014,919, filed Dec. 17, 2004, Leep et al.

* cited by examiner

*Primary Examiner*—James Phan
(74) *Attorney, Agent, or Firm*—Klein, O'Oneill & Singh, LLP

(57) ABSTRACT

A method of calibrating angle drift of a laser radar system is provided, in one aspect of the present invention. The method includes, providing a plurality of virtual fiducials into an xy scanner; and providing a plurality of auxiliary laser sources into the xy scanner. The method also includes, routing a plurality of auxiliary laser beams from the plurality of auxiliary laser sources into the xy scanner; and calibrating an angular position of a plurality of laser directing means. The methods provides creating a calibration signal for updating the angular position of a plurality of scanning mirrors.

21 Claims, 4 Drawing Sheets

METHOD AND SYSTEM FOR CORRECTING ANGULAR DRIFT OF LASER RADAR SYSTEMS

CROSS REFERENCE TO RELATED APPLICATION

None

BACKGROUND OF THE INVENTION

1. Field of the Invention

The present invention relates to laser radar systems, and more particularly, to correcting the angular drift of laser radar systems.

2. Background

Laser Radar systems, among other emerging technologies, require an elevation, azimuth scanner. One of the common and inexpensive alternatives is the galvanometric x y scanner. This scanner is composed of a pair of mirrors each rotated by galvanometric motors about axes that are approximately horizontal and roughly perpendicular to each other. A light beam entering the scanner is reflected from a first mirror onto second mirror in such a way that rotation of the first mirror rotates the beam in azimuth and the second mirror rotates the beam in altitude.

Measurement of the angle of the mirrors is currently done with a capacitive or optical sensor mounted on the galvanometric motor. Both of these sensors have significant calibration drifts with temperature. For a laser radar system operating at a large distance, the angular resolution of the scanner is the limiting factor in the three dimensional accuracy. For example, consider laser radar with a maximum range of 10 meters. If we want a position resolution of 25 microns, then the angular resolution must be 2.5 microradians. Typical drifts in the angular accuracy over time are many times this figure.

This problem has been partially solved by the use of fiducial targets. Fiducial targets are objects mounted in the field of view of the xy scanner which are periodically measured to correct for the angular drift in the galvanometric motors. This solution is not suited for many applications of laser radar systems. For example, the solution would not be suited in measuring articles on a manufacturing floor or assembly line, because setting out the fiducial targets is an extra step in the measurement process and the targets would be in the way of the assembly technicians.

Therefore, there is a need for a method and system for correcting the angular drift of radar systems using internal fiducials.

SUMMARY OF THE PRESENT INVENTION

A method of calibrating angle drift of a laser radar system is provided in one aspect of the present invention. The method includes, providing a plurality of virtual fiducial targets into an xy scanner; and providing a plurality of auxiliary laser sources into the xy scanner. The method also includes, routing a plurality of auxiliary laser beams from the plurality of auxiliary laser sources into the xy scanner; and calibrating an angular position of a plurality of laser directing means.

In another aspect of the present invention, a system for correcting angular drift of a laser radar system is provided. The system includes, a multidimensional laser scanner, the laser scanner including a plurality of motorized mirrors, the mirrors including a field of view, an input aperture, and an output aperture; a plurality of auxiliary laser sources; and a plurality of virtual fiducials.

In another aspect of the present invention, provided are structures for supporting the plurality of auxiliary laser sources near the input aperture; and surfaces for supporting the plurality of virtual fiducials in a plane parallel to the plane of the output aperture.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following figures.

DETAILED DESCRIPTION OF THE PREFERRED EMBODIMENTS

Figure 1A:
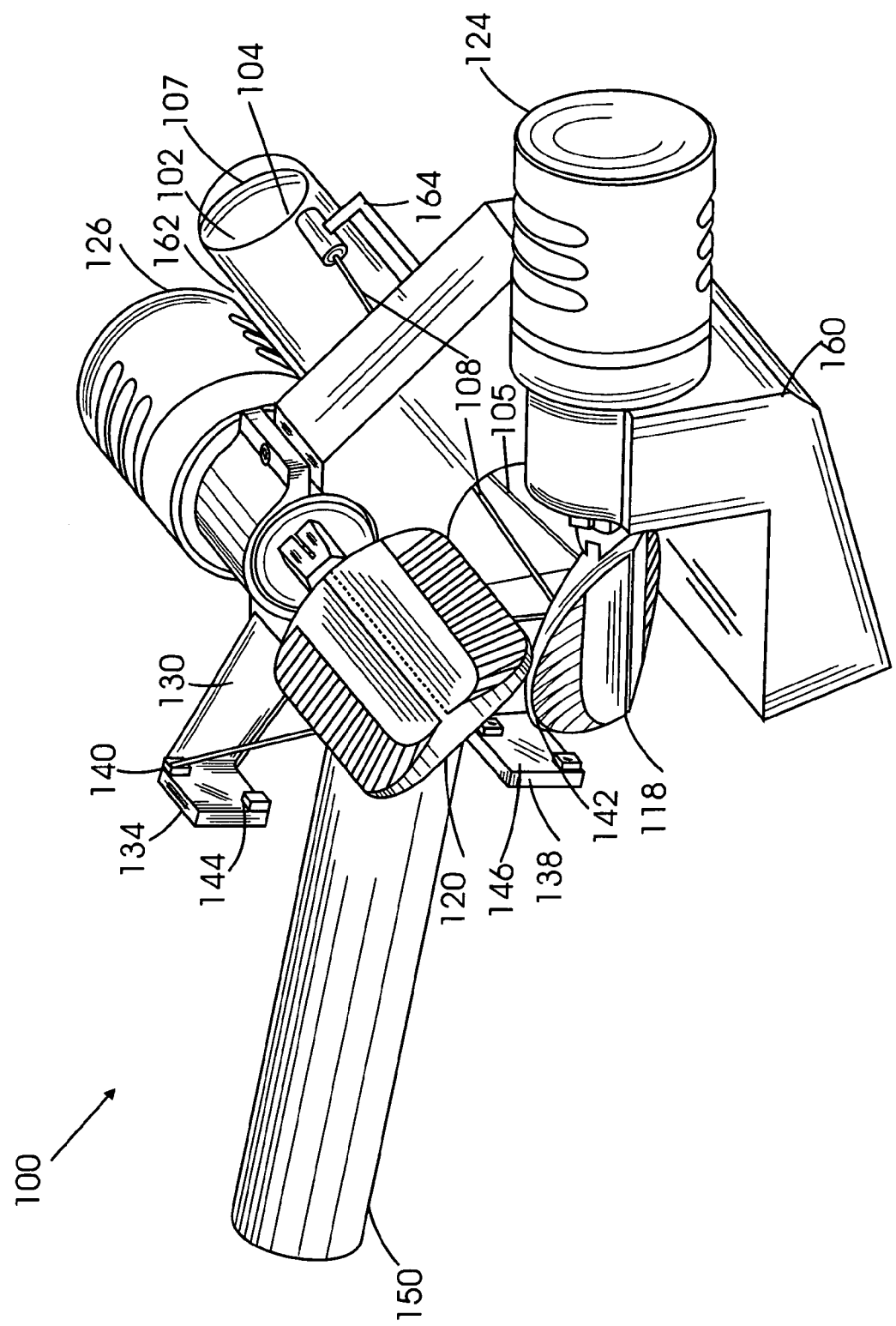
FIG. 1A is a perspective view showing an xy scanner according to one aspect of the present invention.

FIG. 1A is a perspective view of a laser radar system 100 implementing the methods and systems in accordance with the adaptive aspects of the present invention. The system generally includes a main laser beam 150, scanning mirrors, 118, 120, galvanometer motors 124, 126, a laser radar output lens 107, a scanner input aperture 105, a body 160, auxiliary lasers 102, 104 and quad cells 140, 142, 144, 146. The term 'quad cell' as used herein may be interchanged with the term 'virtual fiducial'.

The scanning mirrors 118, 120 generally include an azimuth mirror 118 for scanning in a horizontal direction, and an altitude mirror 120 for scanning in a vertical direction. The scanning mirrors 118, 120 may be coupled to galvanometric motors 124, 126 respectively. The galvanometric motor 124 provides rotation of the azimuth mirror 118 during the horizontal rotation of the main laser beam 150. The galvanometric motor 126 provides rotation of the altitude mirror 120, during the vertical rotation of the main laser beam 150.

The galvanometric motors 124, 126 may also include internal position sensors (not shown). The internal position sensors (not shown) communicate the current angular position of the azimuth mirror 118 and the altitude mirror 120 to a position detection section (not shown).

The laser radar output lens 107 provides the focus needed for the main laser beam 150 before entering the xy scanner 100. The laser radar output lens 107 occupies a plane parallel to the physical plane of an input aperture 105.

The body 160 provides structural support for the accompanying scanning mirrors 118, 120, the galvanometric motors 124, 126, the auxiliary lasers 102, 104 and the quad cells 140, 142, 144, 146. Structural support for the auxiliary lasers 102, 104 and support for the quad cells 140, 142, 144, 146 will be explained in more detail elsewhere below.

Figure 1B:
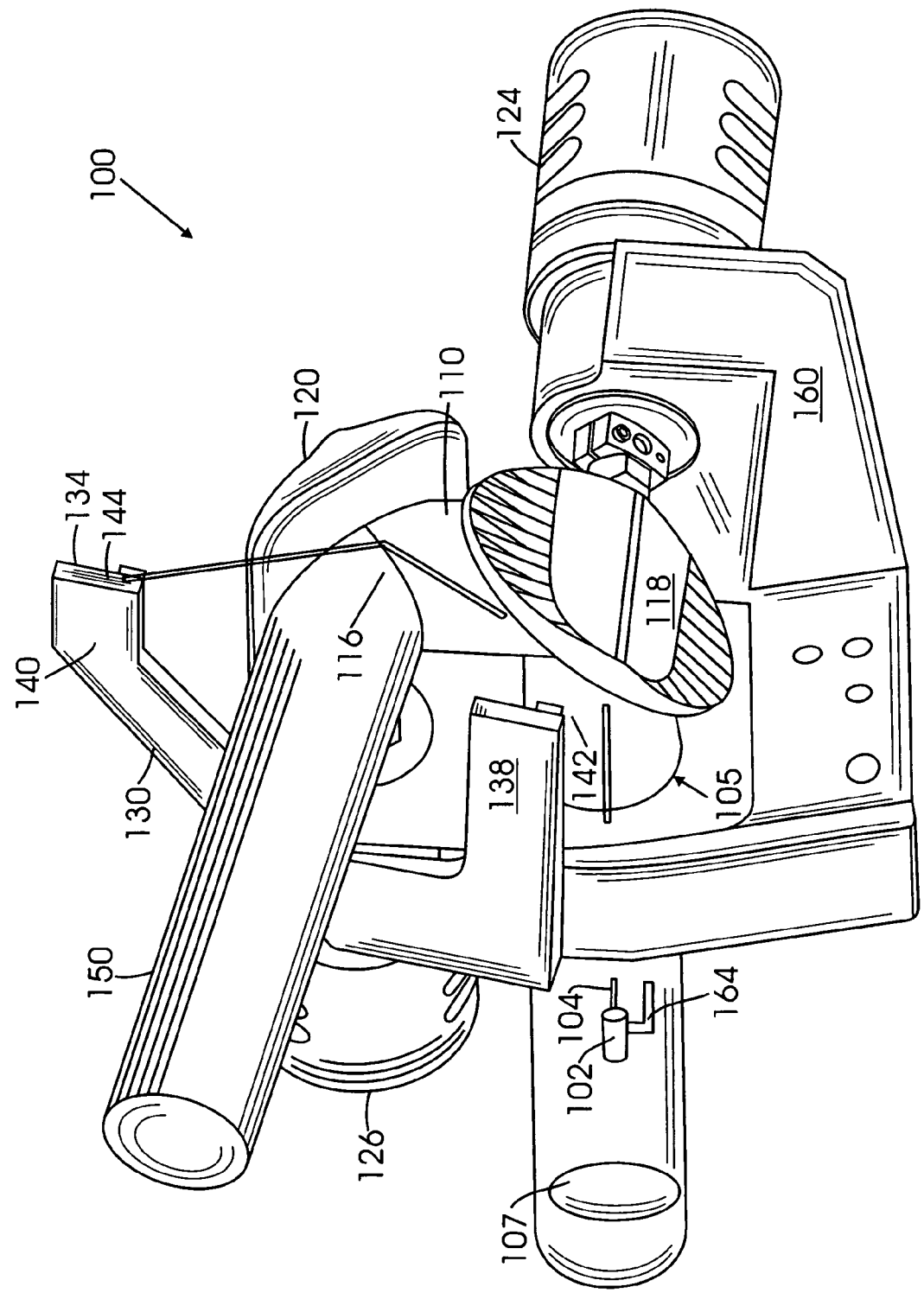
FIG. 1B is a perspective view showing an xy scanner according to another aspect of the present invention.

Still referring to FIG. 1A and FIG. 1B, the auxiliary lasers 102, 104 comprise a first auxiliary laser 102 and a second auxiliary laser 104. The first auxiliary laser 102 may be supported on a first structure 162. The first structure 162 is also coupled to the body 160. Further, the first structure 162 may comprise a material sufficient for a stationary positioning of the first auxiliary laser 102. The positioning of the first auxiliary laser 102 is near a plane parallel to the plane occupied by the input aperture 105.

In a preferred embodiment, the first auxiliary laser 102 is positioned to one side of the input aperture 105, so that a first auxiliary laser beam 106 passes through the input aperture 105. In an alternative embodiment, the first auxiliary laser 102 may be positioned above the input aperture 105 so that the first auxiliary laser beam 106 passes through the input aperture 105.

The second auxiliary laser 104 is supported similarly as the first auxiliary laser 102. A second structure 164 supports the second auxiliary laser 104 and is coupled to the body 160. The positioning of the second auxiliary laser 104 is also near the plane of the laser radar input aperture 105.

In a preferred embodiment, the second auxiliary laser 104 is positioned on the opposite side of the input aperture 105 from laser 102, so that a second auxiliary laser beam 108 passes through the input aperture 105. In an alternative embodiment, the second auxiliary laser 104 may be positioned below the input aperture 105 so that the second auxiliary laser beam 108 passes through the input aperture 105.

As shown in FIGS. 1A and 1B, the quad cells 140, 142, 144, and 146 comprise a first horizontal quad cell 140, a second horizontal quad cell 142, a first vertical quad cell 144 and a second vertical quad cell 146. The quad cells 140, 142, 144, and 146 are a type commonly used by those of ordinary skill in the art to measure an angle of a laser beam. In a preferred embodiment, the quad cells 140, 142, 144, and 146 may be segmented into four regions (not shown). During normal operation, the four regions (not shown) produce an electric current that is proportional to an amount of light sensed by any of the four regions. The centroid is the position on of a quad cell where all four regions (not shown) intersect each other. In normal operation, the four regions (not shown) produce an electric current that is equal to each other when a laser beam is focused on the centroid.

The quad cells 140, 142, 144, and 146 may be supported by a surface 130. The surface 130 lies in a plane parallel to the output aperture (not shown) and the surface 130 is positioned slightly downstream from the altitude mirror 120. Further, the surface 130 is affixed to the body 160. The surface 130 may include an upper arm 134 and a lower arm 138. In one embodiment, the upper arm 134 lies above the output aperture (not shown) and the upper arm 134 supports the horizontal quad cell 140 and the vertical quad cell 144. Similarly, the lower arm 138 lies below the output aperture (not shown) and the lower arm 138 supports the horizontal quad cell 142 and the vertical quad cell 146.

Figure 2:
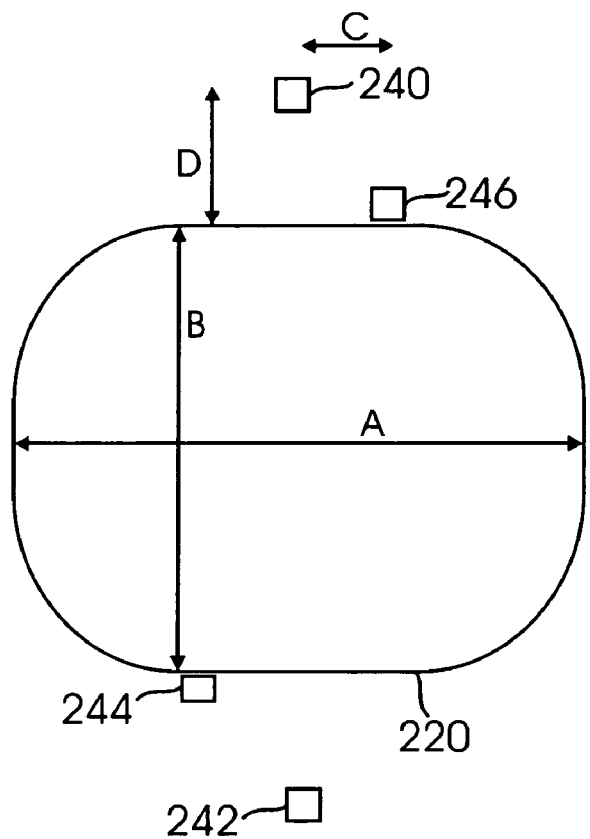
FIG. 2 is a block diagram showing a field of quad cells according to one aspect of the present invention.

FIG. 2, with reference to FIGS. 1A and 1B, shows a block diagram of a placement of quad cells 240, 242, 244, and 246 according to one aspect of the present invention. The quad cells 240, 242, 244, and 246 may be placed near the edges of an optical angular field of view (not shown). The optical angular field of view is typically double the range of a scanning mirror's moving range (not shown). In one aspect of the present invention, the optical angular field of view (not shown) for the azimuth mirror 118 and the altitude mirror 120 is plus and minus twenty degrees. The mirror moving range for the azimuth mirror 118 and the altitude mirror 120 is plus and minus ten degrees.

FIG. 2 shows another aspect of the placement of the quad cells 240, 242, 244, and 246. The placement of the quad cells 240, 242, 244, and 246 may be governed by the size of the output aperture 220 and governed by orientation of the auxiliary lasers. The size of the output aperture 220 is defined by the physical dimensions of the distance A and the distance B. The distances C and D are governed by the orientation of the auxiliary laser, the spacing between the azimuth mirror 118 and the altitude mirror 120, the spacing between the altitude mirror and the fiducial plane and the fixed calibration angles. The distance D is the optimum spacing either above or below the edge of the output aperture 220. This optimum spacing result in placing the first vertical quad cell 244 and the second vertical quad cell 242 near the outer boundary of the vertical optical field of view of the altitude mirror 120.

In one embodiment, the output aperture 220 may comprise the distance 'A' of 153 mm and the distance 'B' of 117 mm. Further, the distance D may equal 45 mm and the distance D may equal 16 mm. Alternatively, other values for the distances A, B, C, and D may be used depending on the size of the output aperture 220 and depending on the optical angular field of view of the scanning mirrors 118, 120.

Figure 3:
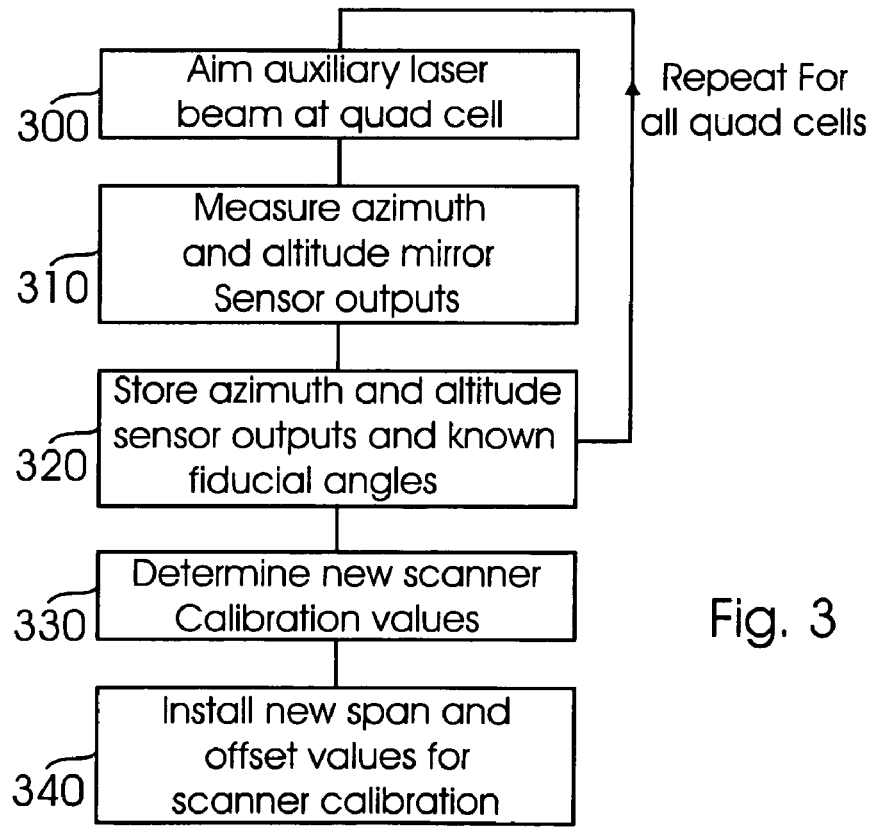
FIG. 3 shows a process flow diagram for calibrating angle drift of a laser radar, according to one aspect of the present invention.

FIG. 3, with reference to FIGS. 1A and 1B, shows a process flow diagram for calibrating angle drift of a laser radar system 100, according to one aspect of the present invention. The process begins in step 300, wherein one of the two auxiliary lasers is aimed at one of the quad cells. The first auxiliary laser beam 106 is first directed through the input aperture 105 towards the azimuth mirror 118. After striking the azimuth mirror 118, the first auxiliary laser beam 106 is directed towards the altitude mirror 120, where the first auxiliary laser beam 106 is reflected by the altitude mirror 120 to strike one of the virtual fiducials 140, 142, 144, and 146. The output of the quad cell is used in a feedback loop to ensure that the laser beam is centered on the quad cell. This aims the scanner system in a previously calibrated and well known direction. In step 310 the output of the altitude and azimuth sensors are measured. In step 320, this sensor data is stored and associated with a known aim direction for this quad cell. This process is repeated for each of the quad cells.

In a routing step 330, the controller (410, FIG. 4) takes all of the sensor measurements and the known aim directions to calculate new values for the span and offset of the altitude and azimuth sensors. In step 340 these values are updated in the calibration module.

The process of steps 300, 310, 320, 330 and 340 are repeated for the output of the second auxiliary laser 104. The second auxiliary laser 104 produces a second auxiliary laser beam 108 that is routed and calibrated in the similar manner as described above In one embodiment, the process in FIG. 3 may be repeated until the auxiliary lasers 102, 104 have employed all four quad cells 140, 142, 144 and 146 in calibrating the xy scanner 100.

Figure 4:
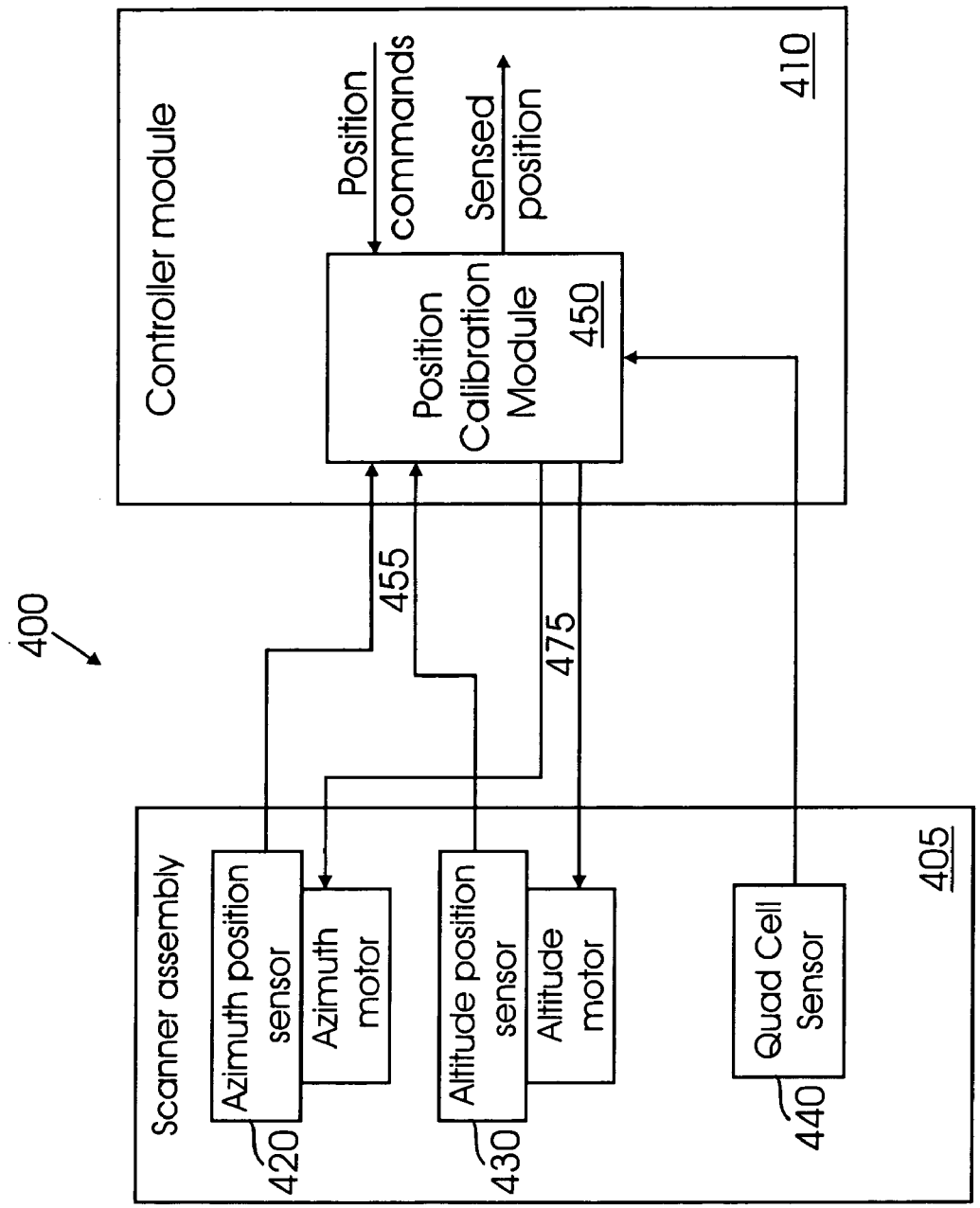
FIG. 4 is a block diagram showing a calibration apparatus for generating a calibration signal according one aspect of the present invention.

FIG. 4 shows a block diagram of a calibration apparatus 400. The apparatus generally includes a scanner assembly 405 and a controller module 410. The scanner module 405 may include position sensors 420, 430, and a quad cell current sensor 440. The position sensors 420, 430 reside internal to the galvanometric motors 124, 126 described elsewhere herein. The quad cell current sensor 440 may reside near the location of the quad cells 140, 142, 144, and 146.

The controller module 410 generally includes a calibration module 450. In normal operation, the position calibration module 450 receives position commands from the controller 410. It converts these commands into electrical signals (475) sent to the scanner motors (420 A and 420B). Subsequently, it receives sensor signals (455) from the azimuth and altitude position sensors (420 and 430, respectively). The calibration module 450 converts these signals to azimuth and altitude angles. Periodically, the calibration procedure described in the previous section is performed.

After the first auxiliary laser beam 106 strikes one of the virtual fiducials 140, 142, 144, and 146, the angular position of the scanning mirrors 118, 120 is sensed by the position sensors 420, 430. Simultaneously, the scanning mirrors 118, 120 are positioned using a nulling technique. The nulling technique comprises focusing the first auxiliary laser beam 106 on the centroid (not shown) of an active quad cell until currents of the four regions equal each other as explained elsewhere herein.

The process of steps 300, 310, 320, 330 and 340 are repeated for the output of the second auxiliary laser 104. The second auxiliary laser 104 produces a second auxiliary laser beam 108 that is routed and calibrated in the similar manner as described above In one embodiment, the process in FIG. 3 may be repeated until the auxiliary lasers 102, 104 have employed all four quad cells 140, 142, 144 and 146 in calibrating the xy scanner 100.

To complete the calibration process, the azimuth and altitude angles associated with each quad cell have been previously measured and are stored in the position calibration module 450. A data set, composed of the measured sensor signals and the previously measured altitude and azimuth angles is assembled. These data are used to calculate new calibration values. The calibration constants in the calibration module 450 are updated and used thereafter to convert position commands to motor signals and sensor outputs to angles.

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A method of correcting angular drift of a laser system, the method comprising:
   providing a plurality of virtual fiducials targets into an xy scanner;
   providing a plurality of auxiliary laser sources into the xy scanner;
   routing a plurality of auxiliary laser beams from the plurality of auxiliary laser sources into the xy scanner; and
   calibrating an angular position of a plurality of laser directing means by
      determining the angular position of the laser directing means relative to known position on the plurality of virtual fiducials targets; and
      generating a calibration value indicative of the angular drift of the laser radar system based upon the angular position of the laser directing means relative to the known position on the plurality of virtual fiducial targets.

2. The method of claim 1, further comprising directing the plurality of auxiliary laser beams through a laser radar output lens.

3. The method of claim 1, wherein the plurality of laser directing means comprises a plurality of motorized mirrors, the mirrors having a field of view.

4. The method of claim 1, wherein routing further comprises:
   directing the plurality auxiliary laser beams onto a first motorized mirror of the xy scanner;
   directing the plurality auxiliary laser beams onto a second motorized mirror of the xy scanner; and
   causing the plurality of auxiliary laser beams to exit the xy scanner.

5. The method of claim 1, further comprising focusing the plurality of auxiliary laser beams exiting the xy scanner onto the plurality of virtual fiducials.

6. The method of claim 1, further comprising measuring an angular position of the plurality of motorized mirrors.

7. The method of claim 1, wherein the step of determining the angular position of the laser directing means relative to a known position on the plurality of virtual fiducials targets includes:
   detecting the angular position of the laser directing means; and
   focusing the auxiliary laser beams on to a known position on the plurality of virtual fiducials by moving the laser directing means and detecting a new angular position of the laser directing means.

8. The method of claim 1, further comprising providing a calibration signal to a position correction section.

9. The method of claim 8, further comprising updating the angular position with the calibration signal.

10. The method of claim 1, wherein the known position on the plurality of virtual fiducials is a centroid of the plurality of virtual fiducials.

11. A method of correcting angular drift of a laser radar system, the method comprising:
   providing a plurality of virtual fiducial targets into an xy scanner;
   providing a plurality of auxiliary laser sources into the xy scanner;
   routing a plurality of auxiliary laser beams from the plurality of a auxiliary laser sources into the xy scanner; and
   calibrating an angular position of a plurality of laser directing means by
      determining the angular position of the laser directing means relative to a known position on the plurality of virtual fiducials targets; and
      generating a calibration value indicative of the angular drift of the laser radar system based upon the angular position of the laser directing means relative to the known position on the plurality of virtual fiducial targets,
      wherein the step of determining including centering the plurality of auxiliary laser beams onto a centroid of the plurality of virtual fiducials by moving a plurality of motorized mirrors of the laser directing means until a plurality of current is equalized.

12. A method of correcting angular drift of a laser radar system, the method comprising:
   providing a plurality of virtual fiducials targets into an xy scanner;
   providing a plurality of auxiliary laser sources into the xy scanner;
   routing a plurality of auxiliary laser beams from the plurality of auxiliary laser sources into the xy scanner; and
   calibrating an angular position of a plurality of laser directing means by
      determining the angular position of the laser directing means relative to a known position on the plurality on virtual fiducials targets; and
      generating a calibration value indicative of the angular drift of the laser radar system based upon the angular position of the laser directing means relative to the known position on the plurality of virtual fiducial targets;

wherein providing the plurality of auxiliary laser sources comprises supporting the plurality of laser sources on structures near an input aperture and positioned above and below the input aperture.

13. A method of correcting angular drift of a laser radar system, the method comprising:

providing a plurality of virtual fiducials targets into an xy scanner;

providing a plurality of auxiliary laser sources into the xy scanner;

routing a plurality of auxiliary laser beams from the plurality of auxiliary laser sources into the xy scanner; and calibrating an angular position of a plurality of laser directing means by determining the angular position of the laser directing means relative to a known position on the plurality of virtual fiducials targets;

and generating a calibration value indicative of the angular drift of the laser radar system based upon the angular position of the laser directing means relative to the known position on the plurality of virtual fiducial targets;

wherein providing the plurality of virtual targets comprises supporting the plurality of virtual fiducials on surfaces in a plane parallel to an output aperture.

14. The method of claim 13, wherein the plurality of laser directing means comprises a plurality of motorized mirrors, the mirrors having a field of view and further comprising positioning the surfaces near an extrema of the field of view.

15. A system for correcting angular drift of a laser radar system, comprising:

a multidimentional laser scanner, the laser scanner comprising an output lens to provide focus to a main laser beam, the output lens located in a plane parallel to an input aperture;

a plurality of motorized mirrors, the mirrors including a field of view;

a plurality of auxiliary laser sources to generate a plurality of auxiliary laser beams;

a plurality of virtual fiducials, the plurality of motorized mirrors configured to direct the plurality of auxiliary laser beams on to the plurality of virtual fiducials;

means for determining the angular position of the motorized mirrors relative to a known position on the plurality of virtual fiducials; and means for generating a calibration value indicative of the angular drift of the laser radar system based upon the angular position of the motorized mirrors relative to the known position on the plurality of virtual fiducials.

16. The system of claim 15, wherein the known position on the plurality of virtual fiducials is a centroid of the plurality of virtual fiducials.

17. The system of claim 15, further comprising a means for processing an output signal of a virtual fiducial.

18. The system of claim 15, wherein the plurality virtual fiducials comprise a light sensing means.

19. A system for correcting angular drift of a laser radar system, comprising:

a multidimentional laser scanner, the laser scanner comprising an output lens to provide focus to a main laser beam, the output lens located in a plane parallel to an input aperture;

a plurality of motorized mirrors, the mirror including a field of view;

a plurality of auxiliary laser sources to generate a plurality of auxiliary laser beams;

structures for supporting the plurality of auxiliary laser sources near the input aperture, the structures may be positioned above the input aperture and below the input aperture;

a plurality of virtual fiducials, the plurality of motorized mirrors configured to direct the plurality of auxiliary laser beams on to the plurality of virtual fiducials;

means for determining the angular position of the motorized mirrors relative to a known position on the plurality of virtual fiducials; and means for generating a calibration value indicative of the angular drift of the laser radar system based upon the angular position of the motorized mirrors relative to the known position on the plurality of virtual fiducials.

20. A system for correcting angular drift of a laser radar system, comprising:

a multidimentional laser scanner, the laser scanner comprising an output lens to provide focus to a main laser beam, the output lens located in a plane parallel to an input aperture;

a plurality of motorized mirrors, the mirrors including a field of view;

a plurality of auxiliary laser sources to generate a plurality of auxiliary laser beams;

a plurality of virtual fiducials, the plurality of motorized mirrors configured to direct the plurality of auxiliary laser beams on to the plurality of virtual fiducials;

means for determining the angular position of the motorized mirrors relative to a known position on the plurality of virtual fiducials;

means for generating a calibration value indicative of the angular drift of the laser radar system based upon the angular position of the motorized mirrors relative to the known position on the plurality of virtual fiducials;

an output aperture; and surfaces for supporting the plurality of virtual fiducials in a plane parallel to the plane of the output aperture.

21. The system of claim 20, wherein the surfaces may be positioned near an extrema of the field of view.

* * * * *